July 30, 1963 HANS-GEORG UNGER 3,099,803

AUTOMATIC FREQUENCY CONTROL FOR TUNABLE OSCILLATORS

Filed July 2, 1959

INVENTOR
H. G. UNGER
BY [signature]
ATTORNEY

United States Patent Office 3,099,803

Patented July 30, 1963

3,099,803

AUTOMATIC FREQUENCY CONTROL FOR TUNABLE OSCILLATORS

Hans-Georg Unger, Lincroft, N.J., assignor to Bell Telephone Laboratories, Incorporated, New York, N.Y., a corporation of New York Filed July 2, 1959, Ser. No. 824,575
6 Claims. (Cl. 331—9)

Figure 1:
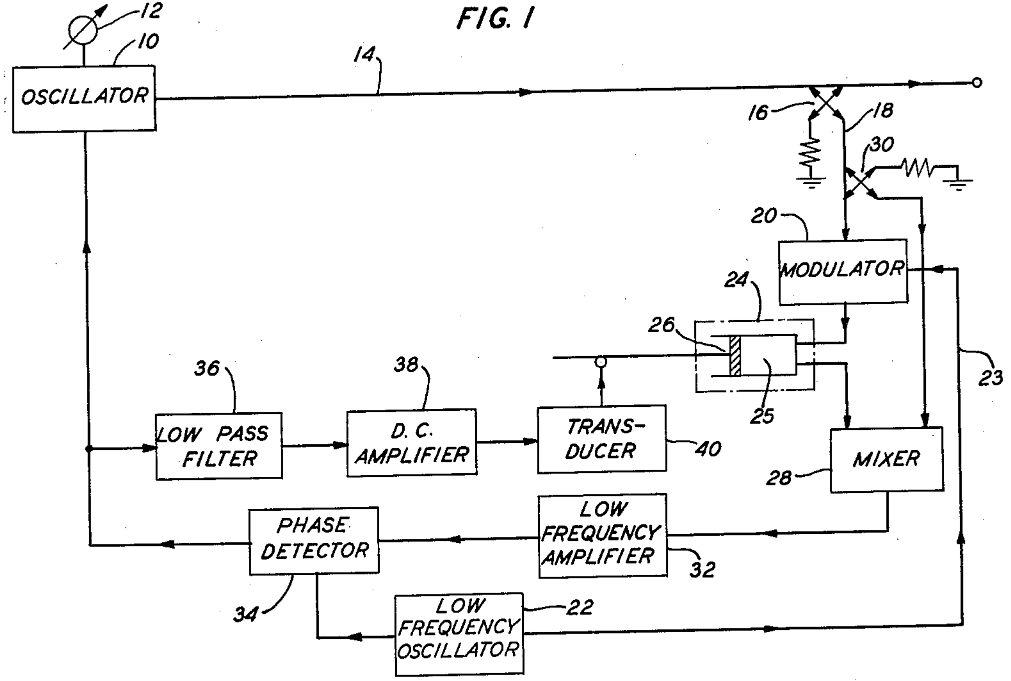

This invention relates to automatic frequency control systems and more particularly to a control system for providing automatic frequency stabilization over a broad range of frequencies swept by a tunable oscillator.

In the past, three general methods of frequency stabilization of oscillators have predominated the art. All utilize a cavity resonator or its equivalent as a reference frequency device. According to a first of these methods, a portion of the output signal from an oscillator is frequency modulated by a low-frequency signal. The frequency modulated signal is applied to the cavity resonator, which is tuned to a particular resonant frequency. The cavity resonator transforms the frequency modulated signal into an amplitude modulated wave which is detected to obtain the low-frequency modulation component thereof. The phase of this component is compared with that of the low-frequency signal in a phase detector and a voltage produced which is proportionate to the difference between the average frequency of the frequency modulated output and the resonant frequency of the cavity resonator. This voltage is applied to a frequency control element of the oscillator to provide frequency stabilization.

According to the second method, a portion of the output of an oscillator is applied to a cavity resonator, the resonant frequency of which is varied at a particular low-frequency rate by an electromechanical modulator. The amplitude modulated output signal of the cavity resonator is detected to obtain the component thereof which alternates at the low frequency of the modulating signal. The phase of the detected wave is again compared with that of the low-frequency signal and a voltage produced which is proportionate thereto. This voltage is applied to a frequency controlling element of the oscillator to stabilize the oscillator at the average resonant frequency of the cavity.

A third method, which is specifically described in the patent to R. V. Pound, 2,681,998, June 22, 1954, utilizes a waveguide hybrid or magic T, three branches of which are terminated by a cavity resonator, a modulator crystal, and a mixer crystal, respectively. A portion of the output signal of an oscillator is coupled into the free branch of the magic T. This signal divides equally between the branches terminated by the cavity and the mixer crystal. The portion applied to the mixer crystal, which is matched to its associated branch, is absorbed. The signal applied to the cavity is reflected, one-half of the energy being transmitted back into the free branch where it is absorbed and the remainder being transmitted to the modulator crystal. An intermediate frequency signal is applied to the modulator crystal from a signal source external to the magic T. Due to this, the impedance of the modulator crystal varies and the portion of the energy applied thereto is amplitude modulated and reflected; the phase of the amplitude modulated energy being dependent upon the phase of the signal reflected by the cavity resonator. A portion of the amplitude modulated energy reflected from the modulator crystal is applied to the mixer crystal where it is detected. As described in the above-mentioned patent to Pound, the remainder of the energy reflected from the modulator crystal is absorbed in the magic T and therefore need not be considered. The detected component of the energy applied to the mixer crystal is compared in phase with the signals from the intermediate frequency source and a voltage produced which is proportionate thereto. This voltage is applied to a frequency control element of the oscillator to stabilize the frequency thereof.

It is apparent from the above discussion that adequate frequency stabilization systems exist for microwave oscillators having a particular single-frequency output. However, these systems, as described, are not functional over a range of frequencies and are essentially useless for the frequency control of oscillators tunable over a broad range of frequencies. In systems employing the previously mentioned methods of frequency stabilization, variations in the output frequency of the oscillator are immediately compensated for by the control system associated with the cavity resonator. Therefore, as one attempts to vary slowly the output frequency of the oscillator, as by tuning, from that of the resonant frequency of the cavity, the control system will continually attempt to compensate for such a variation and return the oscillator to the particular resonant frequency of the cavity. Under such conditions, the desirable effects of the frequency control system would be completely lost. If one should vary the frequency of the oscillator to such a degree that it would operate outside the frequency range of the cavity resonator, the system would no longer attempt to counteract for the variation in output frequency but would also be ineffective as a stabilization system against rapid changes in output frequencies.

In order to overcome these problems using the prior art systems, it would be necessary to first determine a particular frequency to which a change is desired, then by some means, not disclosed, to adjust the resonant frequency of the cavity to the particular frequency or modulated frequency desired and finally to vary the output frequency of the oscillator to fall within the frequency range of compensation of the control system. Such a procedure would have to be repeated for each frequency desired. It is certainly apparent that this process would be tedious, time consuming, and subject to many possible errors.

In view of the above, it is the object of this invention to provide continuous automatic frequency stabilization for a tunable oscillator over a broad range of frequencies.

In accordance with the above object, there is provided as one embodiment of this invention, a tunable oscillator including means for slowly varying the output thereof over a range of frequencies. A portion of the output signal of the tunable oscillator is modulated by a fixed low-frequency signal. The modulated signal is applied to a reference frequency element, such as a transmission cavity, tuned to a particular component of the modulated signal. The output of the reference element is coupled to a mixer which generates a wave alternating at the fixed low frequency of the modulating wave and having the phase characteristics of the output signal of the reference element. The phase of the mixer output signal is compared with that of the modulating wave and a voltage is produced, the magnitude and polarity of which are, respectively, functions of the frequency difference between the two signals and their relative phase. This voltage is then applied to a frequency controlling element of the tunable oscillator to compensate for rapid variations in the output frequency of the tunable oscillator. As the output of the tunable oscillator is slowely varied over a range of frequencies, as for example, by electronic or manual tuning, the voltage produced by the phase comparison will change slowly with time. This change is detected and used to vary automatically the resonant frequency of the reference element. Therefore, as the oscillator is tuned, the resonant frequency of the reference element is changed in accord therewith. This allows the voltage produced by the phase comparison and applied to the tunable oscillator to continually provide accurate frequency stabilization over any range of frequencies swept by the oscillator.

Figure 2:
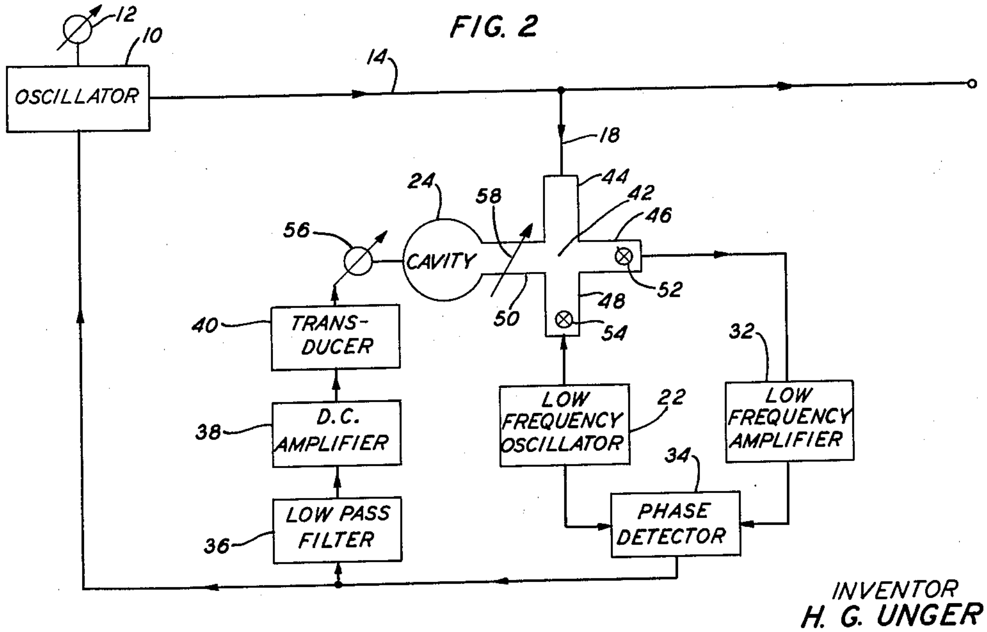

The above and other features of this invention as briefly illustrated by the above embodiment may be more fully understood by reference to the drawing in which:

FIG. 1 is a block diagram of an automatic frequency control system embodying the features of this invention; and FIG. 2 is a block diagram of an automatic frequency control system utilizing a waveguide hybrid junction or magic T employing the features of this invention.

Referring more particularly to the drawing, in which like parts are referred to by like reference numerals, there is disclosed in FIG. 1 a control system in which a portion of the output signal of a tunable oscillator 10, having tuning means 12 for slowly varying the output thereof over a range of frequencies, is coupled from an output path 14 by a directional coupler 16. In a typical embodiment of this invention, oscillator 10 and tuning means 12 may together comprise a reflex klystron employing cavity tuning. The signal abstracted by coupler 16 is applied by transmission path 18 to a modulator 20 which may, for example, be a balanced crystal amplitude modulator. The output of oscillator 10 applied to modulator 20 is amplitude modulated by the output of a low-frequency oscillator 22, which is applied to modulator 20 over path 23. The amplitude modulated signal is coupled into a reference frequency element 24, which is represented as being a transmission cavity 25 having means for varying the resonant frequency thereof represented by a piston 26. A transmission cavity of the type here employed is a cavity resonator having input and output circuits so positioned that only energy at the resonant frequency of the cavity will be retransmitted by the output circuit. At radio and lower frequencies, reference element 24 may be a variable tank circuit. Reference element 24 is initially tuned to a particular component of the modulated signal, for example, the upper sideband frequency. Reference element 24 transmits the particular component of the modulated signal to which it is tuned to a mixer 28 and reflects all other components back to modulator 20 where they are absorbed.

Coupled to path 18, between directional coupler 16 and modulator 20, is a directional coupler 30. Coupler 30 abstracts a small portion of the output signal of oscillator 10, which is present in path 18 and applies the same to mixer 28, which may, for example, be a pentagrid vacuum tube mixer. In response to the signals applied to mixer 28, there is produced a low-frequency signal alternating at the frequency of oscillator 22 and having the phase characteristics of the signal transmitted by reference element 24. The low-frequency signal produced by mixer 28 is amplified by a low-frequency amplifier 32 and applied to a phase detector 34. Detector 34 compares the phase of the mixer output signal with the output of oscillator 22 and produces a voltage proportionate thereto. In one embodiment of this invention, detector 34 may be a pentode vacuum tube having the output of oscillator 22 applied to its suppressor grid and that of the mixer 28 applied to its control grid. The magnitude and polarity of the control voltage produced by phase detector 34 are, respectively, functions of the frequency difference between the compared signals and their relative phase. This control voltage is applied directly to a frequency controlling element of the tunable oscillator to compensate for rapid variations in the output frequency of oscillator 10. When utilizing a reflex klystron as the tunable oscillator, this voltage would be applied to the reflector element of the klystron.

As previously mentioned, when the output frequency of oscillator 10 is slowly varied by either electronic or manual tuning, the voltage produced by detector 34 also varies slowly in a like manner. The slow variation in the control voltage is utilized to vary the resonant frequency of reference element 24 in accord with the tuning of the output frequency of oscillator 10. This is accomplished by applying the control voltage to a low pass filter 36 which passes the slow variation in the control voltage to a direct-current amplifier 38. The output of direct-current amplifier 38 is utilized by a transducer 40 to vary the resonant frequency of reference element 24. In a preferred embodiment of this invention, transducer 40 may be a motor energized by the output of direct-current amplifier 38 and coupled to piston 26. Thus, the output signal of direct-current amplifier 38 varies the position of the piston 26 in cavity 25, thereby producing a new resonant frequency for reference element 24.

The above arrangement produces a continuous frequency stabilization for oscillator 10 at any particular frequency, for as the output of oscillator 10 is varied, the resonant frequency of reference element 24 is likewise adjusted; therefore, the voltage produced by phase detector 34 at any particular time is an accurate measure of any rapid variations in the output frequency of oscillator 10, and upon being applied to a frequency controlling element thereof, produces accurate frequency stabilization.

FIG. 2 discloses an automatic frequency stabilization system in accordance with the features of this invention and utilizes a waveguide bridge such as magic T 42 having four branches 44, 46, 48, and 50; including means 58 for adjusting the phase of signals reaching the junction. As described in connection with FIG. 1, a portion of the output signal of a tunable oscillator 10 is coupled from output path 14 into path 18. The portion of the output transmitted by path 18 is applied to branch 44 of magic T 42. In accordance with known principles of the waveguide bridge (magic T), the energy applied to branch 44 divides equally between branches 46 and 50. The energy transmitted to branch 46 is absorbed by a mixer crystal 52, terminating branch 46 and so mounted as to absorb any output signal from oscillator 10. The energy applied to branch 50 is reflected by a resonant cavity 24, terminating branch 50 and being tuned to the output frequency of oscillator 10 by tuning means 56. Tuning means 56 may be any means for varying the resonant frequency of cavity 24 either mechanical, such as a tuning plug, or electrical, such as a ferrite material, the transmission characteristics of which are controlled by an external electrical signal. The energy reflected by cavity 24 divides equally between branches 44 and 48. The portion of the reflected signal transmitted to branch 44 is absorbed while that portion applied to branch 48 is received by a modulator crystal 54 which terminates branch 48. Crystal 54 is so mounted that when short-circuited it is matched to branch 48 and the signals applied thereto are absorbed; however, due to the application of a signal from low-frequency oscillator 22, external to magic T 42, the impedance of crystal 54 is varied and the energy applied thereto is both amplitude modulated and reflected. The reflected amplitude modulated signal divides, a portion being transmitted to cavity 24 where it is reflected and then absorbed in branches 44 and 48, and the remainder being applied to mixer crystal 52. As more completely described in the patent to R. V. Pound, 2,681,998, crystal 52 detects the amplitude modulation component of the signal applied thereto and produces a voltage alternating at the low frequency of oscillator 22 and having the phase characteristics of the reflected amplitude modulated signal applied to mixer crystal 52. As described in connection with FIG. 1, the output of mixer crystal 52 is amplified by a low-frequency amplifier 32 and compared in phase with the output of oscillator 22 at phase detector 34. The output of detector 34 is applied to a frequency controlling element of oscillator 10 to provide frequency stabilization and also to low-pass filter 36 which passes only the slow variations in the voltage produced by the tuning of oscillator 10. The voltage passed by filter 36 is applied to direct-current amplifier 38 and utilized by transducer 40 to control tuning means 56 and, therefore, the resonant frequency of cavity 24. Thus, continuous frequency stabilization of oscillator 10 is again achieved over the range of frequencies swept thereby.

What is claimed is:

1. An automatic frequency control system for tunable oscillators comprising in combination with a tunable oscillator having a frequency controlling element and tuning means for slowly varying the output frequency of said tunable oscillator over a range of frequencies, a source of modulated signals, means for modulating a portion of the output from said oscillator with said modulating signal, an adjustable reference frequency element tuned to a particular component of the modulated signal, means for applying the modulated signal to said reference element, means for detecting the phase difference between any signal transmitted from said reference element and said modulating signal and producing a voltage proportionate thereto, means responsive to slow variations in said voltage for varying the resonant frequency of said reference element in accordance with slow variations in the output frequency of said tunable oscillator, and means for applying said voltage to said frequency controlling element of said tunable oscillator to compensate for any rapid variations in the output frequency of said tunable oscillator.

2. An automatic frequency control system for tunable oscillators comprising in combination with a tunable oscillator including a frequency controlling element and means for slowly varying the output frequency of said tunable oscillator a first coupling means connected for abstracting a portion of the output of said tunable oscillator therefrom, a second coupling means for obtaining a second portion of the output of said tunable oscillator, a low-frequency oscillator, means for modulating the output of said low-frequency oscillator upon the portion of output of said tunable oscillator abstracted by said first coupling means, a transmission cavity resonant at a particular component of the modulated signal and including means for varying the resonant frequency thereof, a mixer for producing a signal at the frequency of said low-frequency oscillator, means for applying the output signal transmitted from said transmission cavity to said mixer, means for applying the second portion of the output of said tunable oscillator to said mixer, thereby producing a signal at the output of said mixer having the phase of the signal transmitted from said cavity and the frequency of said low-frequency oscillator, means for comparing the phase of the outputs of said mixer and said low-frequency oscillator and producing a voltage proportionate thereto, means responsive only to the low-frequency components of said voltage for varying the resonant frequency of said cavity, and means for applying said voltage to said frequency controlling element of said tunable oscillator to provide frequency stabilization therefor.

3. An automatic frequency control system for tunable oscillators comprising in combination a tunable oscillator having a frequency controlling element and means for slowly varying the output frequency of said tunable oscillator over a range of frequencies, a hybrid junction having first, second, third and fourth branches, said second branch including means for adjusting the phase of signals reaching said junction, means for coupling a portion of the output of said tunable oscillator to said first branch, a cavity resonator terminating said second branch and including means for varying the resonant frequency thereof, a modulator terminating said third branch, a mixer matched to said hybrid junction and terminating said fourth branch, a source of low-frequency signals, means for applying said low-frequency signals to said modulator, means for comparing the phase of said low-frequency signals with the output of said mixer and producing a voltage proportionate thereto, means responsive to slow variations in said voltage for controlling the resonant frequency of said cavity in accordance with slow variations in the output of said tunable oscillator, and means for applying said voltage to said frequency controlling element of said tunable oscillator to provide frequency stabilization thereof.

4. An automatic frequency control system for tunable oscillators comprising in combination with a tunable oscillator having a frequency controlling element and means for slowly varying the output frequency of said tunable oscillator over a range of frequencies a waveguide hybrid junction having first, second, third and fourth branches, said second branch including means for adjusting the phase of signals reaching said junction, means for coupling a portion of the output of said tunable oscillator to said first branch, a cavity resonator terminating said second branch and including means for varying the resonant frequency thereof, a modulator crystal terminating said third branch, a mixer crystal matched to said hybrid junction and terminating said fourth branch, a source of low-frequency signals, means for applying said low-frequency signals to said modulator crystal, means for comparing the phase of said low-frequency signals with the output of said mixer crystal and producing a voltage proportionate thereto, a low-pass filter in series with a direct-current amplifier, means for applying said voltage to said low-pass filter whereby slow variations in said voltage will produce a signal at the output of said direct-current amplifier, means responsive to the direct-current amplifier output for varying the resonant frequency of said cavity in accordance with slow variations in the output of said tunable oscillator, and means for applying said voltage to said frequency controlling element of said tunable oscillator to compensate for any rapid variations in the output frequency thereof.

5. An automatic frequency control system for tunable oscillators comprising in combination with a tunable oscillator having a frequency controlling element and tuning means for slowly varying the output frequency of said tunable oscillator over a range of frequencies, an adjustable frequency reference comprising a transmission cavity, means for developing a signal which is representative of the difference in frequency between the output of said tunable oscillator and said reference, means responsive only to slow variations in said signal for controlling the frequency of said reference in accordance with slow variations in the output of said tunable oscillator, and means for applying said signal to said frequency controlling element of said tunable oscillator to compensate for any rapid variations in the output frequency of said tunable oscillator.

6. An automatic frequency control system for tunable oscillators comprising in combination with a tunable oscillator having a frequency controlling element and tuning means for slowly varying the output frequency of said tunable oscillator over a range of frequencies, an adjustable frequency reference, means for developing a signal which is representative of the difference in frequency between the output of said tunable oscillator and said reference, means responsive only to slow variations in said signal for controlling the frequency of said reference in accordance with slow variations in the output of said tunable oscillator, said means for controlling the frequency of said reference including in series a low-pass filter, a direct-current amplifier, and means responsive to the output of said direct-current amplifier for varying the frequency of said reference, and means for applying said signal to said frequency controlling element of said tunable oscillator to compensate for any rapid variations in the output frequency of said tunable oscillator.

References Cited in the file of this patent

UNITED STATES PATENTS

| | | |
|---|---|---|
| 2,245,627 | Varian | June 17, 1941 |
| 2,731,564 | Edlstein | Jan. 17, 1956 |
| 2,743,362 | Leed | Apr. 24, 1956 |
| 2,964,715 | Winkler | Dec. 13, 1960 |

FOREIGN PATENTS

| | | |
|---|---|---|
| 149,825 | Australia | Feb. 3, 1953 |
| 675,033 | Great Britain | July 2, 1953 |